(12) United States Patent
Adams et al.

(10) Patent No.: US 11,914,719 B1
(45) Date of Patent: Feb. 27, 2024

(54) SYSTEMS AND METHODS FOR CYBERTHREAT-RISK EDUCATION AND AWARENESS

(71) Applicant: Wells Fargo Bank, N.A., San Francisco, CA (US)

(72) Inventors: Chad E. Adams, Fairview Heights, IL (US); Daniel Robert Caricato, Fort Mill, SC (US); Kahlidah B. Covington, Kannapolis, NC (US); Ashley Brook Godfrey, Chambersburg, PA (US); Christopher Wayne Howser, Concord, NC (US); Nicola A. Maiorana, Charlotte, NC (US); Nirali J. Patel, Pineville, NC (US); Richard Joseph Schroeder, Charlotte, NC (US); Roger Daryll White, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 709 days.

(21) Appl. No.: 16/849,589

(22) Filed: Apr. 15, 2020

(51) Int. Cl.
*G06F 21/57* (2013.01)
*G06F 16/9535* (2019.01)
(Continued)

(52) U.S. Cl.
CPC ........ *G06F 21/577* (2013.01); *G06F 16/9535* (2019.01); *G06Q 10/107* (2013.01);
(Continued)

(58) Field of Classification Search
CPC .... G06Q 30/016; G06Q 10/10; G06Q 10/107; G06Q 50/265; G06F 9/451; G06F 16/958;
(Continued)

(56) References Cited

U.S. PATENT DOCUMENTS

| 7,747,494 B1 | 6/2010 | Kothari et al. |
| 7,891,003 B2 | 2/2011 | Mir et al. |

(Continued)

FOREIGN PATENT DOCUMENTS

| CN | 108369541 A | 8/2018 |
| CN | 109299843 A | 2/2019 |

(Continued)

OTHER PUBLICATIONS

Phising Tackle Limited, Running a Baseline Phising Test, Published Aug. 2022 via Phising Tackle Limited, pp. 1-6 (pdf).*

(Continued)

*Primary Examiner* — Manglesh M Patel
(74) *Attorney, Agent, or Firm* — SCHWEGMAN LUNDBERG & WOESSNER, P.A.

(57) ABSTRACT

A system determines a baseline cyberthreat-risk score for a user, and displays the baseline cyberthreat-risk score via a user interface. The system presents at least one cyberthreat-education activity via the user interface, and receives, via the user interface, at least one user input associated with the presented at least one cyberthreat-education activity. The system generates an updated cyberthreat-risk score at least in part by updating the baseline cyberthreat-risk score based at least in part on the user input, and displays the updated cyberthreat-risk score via the user interface.

17 Claims, 5 Drawing Sheets

(51) Int. Cl.
*G06Q 10/107* (2023.01)
*G06Q 50/26* (2012.01)
*G09B 7/00* (2006.01)
*G09B 19/00* (2006.01)
G06F 3/0482 (2013.01)
H04L 9/40 (2022.01)
H04L 67/306 (2022.01)

(52) U.S. Cl.
CPC .......... *G06Q 50/265* (2013.01); *G09B 7/00* (2013.01); *G09B 19/0053* (2013.01); *G06F 3/0482* (2013.01); *G06F 2221/034* (2013.01); *H04L 63/1483* (2013.01); *H04L 67/306* (2013.01)

(58) Field of Classification Search
CPC .............. G06F 9/44526; G06F 21/577; G06F 16/9535; G06F 3/0482; G06F 2221/034; G06T 11/60; G06T 2200/24; G09B 19/0053; G09B 7/00; G09B 9/00; H04L 63/1483; H04L 67/306
USPC ............................................ 715/234; 726/22
See application file for complete search history.

(56) References Cited

U.S. PATENT DOCUMENTS

| | | | |
|---|---|---|---|
| 9,324,119 | B2 | 4/2016 | Singh et al. |
| 9,367,694 | B2* | 6/2016 | Eck ................. G06F 21/552 |
| 9,503,472 | B2* | 11/2016 | Laidlaw ............ H04L 63/1466 |
| 9,596,256 | B1* | 3/2017 | Thomson ........... H04L 63/1433 |
| 9,846,780 | B2 | 12/2017 | Tonn et al. |
| 10,021,138 | B2 | 7/2018 | Gill et al. |
| 10,063,654 | B2 | 8/2018 | Kirti et al. |
| 10,084,809 | B1 | 9/2018 | Rambo et al. |
| 10,121,115 | B2* | 11/2018 | Chrapko ............ G06N 20/00 |
| 10,255,439 | B2 | 4/2019 | Agarwal |
| 10,313,389 | B2 | 6/2019 | Hovor et al. |
| 10,318,741 | B2 | 6/2019 | Zhang |
| 10,326,776 | B2 | 6/2019 | Ford et al. |
| 10,333,990 | B2 | 6/2019 | Jacobs |
| 10,419,465 | B2 | 9/2019 | Muddu et al. |
| 10,425,444 | B2* | 9/2019 | Elworthy ........... H04L 63/1408 |
| 10,491,624 | B2* | 11/2019 | Ng .................... G06Q 40/08 |
| 10,518,162 | B2* | 12/2019 | Morton ............... G06N 3/006 |
| 10,681,068 | B1* | 6/2020 | Galliano ............ H04L 63/1425 |
| 10,778,839 | B1* | 9/2020 | Newstadt ........... H04M 1/663 |
| 10,992,698 | B2* | 4/2021 | Patel ................. H04L 63/1433 |
| 11,170,119 | B2* | 11/2021 | Espinosa ........... H04W 12/009 |
| 11,258,819 | B1* | 2/2022 | Agarwal ............ H04L 63/1425 |
| 11,429,713 | B1* | 8/2022 | Donovan ........... G06F 21/57 |
| 2016/0104485 | A1* | 4/2016 | Allen .................. G10L 17/08 704/9 |
| 2016/0285907 | A1* | 9/2016 | Nguyen ............ H04L 63/1433 |
| 2017/0104778 | A1* | 4/2017 | Shabtai .............. H04L 63/1425 |
| 2017/0118239 | A1 | 4/2017 | Most et al. |
| 2017/0148347 | A1* | 5/2017 | Stinson .............. G06F 9/45558 |
| 2017/0169230 | A1 | 6/2017 | Zheng et al. |
| 2017/0244746 | A1* | 8/2017 | Hawthorn .......... H04L 63/1408 |
| 2017/0324766 | A1* | 11/2017 | Gonzalez Granadillo ........ H04L 63/20 |
| 2017/0324768 | A1* | 11/2017 | Crabtree ............ H04L 63/1433 |
| 2017/0331839 | A1* | 11/2017 | Park .................. H04L 63/1425 |
| 2017/0366572 | A1* | 12/2017 | King-Wilson ....... H04L 63/1433 |
| 2018/0013771 | A1* | 1/2018 | Crabtree ............ H04L 63/1416 |
| 2018/0159881 | A1* | 6/2018 | Crabtree ............ H04L 63/1425 |
| 2018/0191754 | A1* | 7/2018 | Higbee .............. H04L 63/1416 |
| 2018/0191771 | A1 | 7/2018 | Newman et al. |
| 2018/0248863 | A1* | 8/2018 | Kao ................... H04L 63/102 |
| 2018/0255097 | A1 | 9/2018 | Li et al. |
| 2018/0295154 | A1* | 10/2018 | Crabtree ............ H04L 63/1433 |
| 2019/0052664 | A1 | 2/2019 | Kibler et al. |
| 2019/0095320 | A1 | 3/2019 | Biswas et al. |
| 2019/0156342 | A1 | 5/2019 | Xia et al. |
| 2019/0158535 | A1* | 5/2019 | Kedem ............... G06F 16/00 |
| 2019/0260782 | A1* | 8/2019 | Humphrey .......... G06N 20/10 |
| 2020/0201992 | A1* | 6/2020 | Hadar ................ G06F 21/56 |
| 2020/0267183 | A1* | 8/2020 | Vishwanath ........ H04L 63/1483 |
| 2020/0311790 | A1* | 10/2020 | Keren ................ G06Q 20/4016 |
| 2021/0029164 | A1* | 1/2021 | Albero ............... H04L 63/20 |
| 2021/0064762 | A1* | 3/2021 | Salji ................... G06F 9/455 |
| 2021/0067541 | A1* | 3/2021 | Basu ................... H04L 41/22 |
| 2021/0090463 | A1* | 3/2021 | Atencio ............. H04L 63/1433 |
| 2021/0112064 | A1* | 4/2021 | Losseva ............. H04L 63/102 |
| 2021/0192053 | A1* | 6/2021 | Spisak ............... G06N 20/00 |
| 2021/0193174 | A1* | 6/2021 | Enzinger ............ G10L 17/00 |
| 2021/0240836 | A1* | 8/2021 | Hazony .............. G09B 5/00 |
| 2021/0243219 | A1* | 8/2021 | Kawakita ........... G06F 21/55 |
| 2021/0312400 | A1* | 10/2021 | Irimie ................. G06Q 10/0635 |
| 2021/0344713 | A1* | 11/2021 | Kras .................. H04L 51/18 |
| 2021/0407308 | A1* | 12/2021 | Brubaker ........... G09B 5/02 |
| 2022/0038498 | A1* | 2/2022 | Kras .................. G09B 19/0053 |
| 2022/0060499 | A1* | 2/2022 | Huda ................ H04L 63/1416 |
| 2022/0070214 | A1* | 3/2022 | Kras ................. H04L 63/1483 |
| 2022/0150273 | A1* | 5/2022 | Basu ................. G09B 19/0053 |
| 2022/0278993 | A1* | 9/2022 | Korakin ............ H04L 63/145 |
| 2022/0360597 | A1* | 11/2022 | Fellows ............ G06F 21/577 |
| 2022/0377101 | A1* | 11/2022 | Kras ................. H04L 63/1483 |
| 2022/0394052 | A1* | 12/2022 | Grossman-Avraham ......... G06F 21/50 |
| 2023/0058138 | A1* | 2/2023 | Covell .............. H04L 63/0861 |
| 2023/0066777 | A1* | 3/2023 | Rodriguez ......... G06F 21/552 |
| 2023/0073905 | A1* | 3/2023 | Cavallaro .......... H04L 63/1483 |
| 2023/0081399 | A1* | 3/2023 | Murphy ............ G06Q 10/06395 705/7.42 |
| 2023/0188564 | A1* | 6/2023 | Camarata .......... H04L 63/1425 726/1 |

FOREIGN PATENT DOCUMENTS

| | | |
|---|---|---|
| CN | 110110981 A | 8/2019 |
| CN | 107196910 B | 9/2019 |

OTHER PUBLICATIONS

Sophos, Sophos Phish Threat, Published Jul. 11, 2022 by Sophos, pp. 1-2 (pdf).*

NIST, The Phish Scale: NIST-Developed Method Helps IT Staff See Why Users Click on Fraudulent Emails, Published Sep. 17, 2020 by National Institute of Standards and Technology, pp. 1-4 (pdf).*

Caitlin Jones, The Top 11 Phising Awarness Training Solutions, Published Mar. 14, 2023 via Expert Insights, pp. 1-17 (pdf).*

KnowBe4, Recommendations for the Most Effective Baseline Phishing Test, Published 2018 via wayback archive, pp. 1-2 (pdf).*

"Enterprise Threat Simulation", AIS Network, [Online]. Retrieved from the Internet: <URL: https://www.aisn.net/enterprise-threat-simulation/>, (2019), 9 pgs.

"Risk Mitigation Planning, Implementation, and Progress Monitoring", The MITRE Corporation, [Online]. Retrieved from the Internet: <URL: https://www.mitre.org/publications/systems-engineering-guide/acquisition-systems-engineering/risk-management/risk-mitigation-planning-implementation-and-progress- monitoring>, (Accessed Sep. 19, 2019), 7 pgs.

Legg, Philip, "Visualizing the Insider Threat: Challenges and tools for identifying malicious user activity", IEEE Symposium on Visualization for Cyber Security (VIZSEC), [Online]. Retrieved from the Internet: <URL: http://eprints.uwe.ac.uk/27441/1/2015-VizSec_preprint.pdf>, (2015), 7 pgs.

* cited by examiner

SYSTEMS AND METHODS FOR CYBERTHREAT-RISK EDUCATION AND AWARENESS

BACKGROUND

Billions of people around the world use various different communication and computing devices on a daily basis for many different purposes such as social networking, conducting personal business (e.g., financial transactions), conducting work-related activities, online shopping, browsing the web and/or engaging in other forms of Internet communication for entertainment purposes or to gather the news of the day, and/or the like. Indeed, digital communications and computing have become increasingly ubiquitous presences in modern life, and that trend is only expected to continue.

With the increased use and pervasiveness of digital communications and computing comes increased complexity. As an example, a financial-services institution may interact with its customers many billions of times per year in ways such as in person at storefront locations (e.g., banks), online (via, e.g., web portals, mobile applications ("apps"), and/or the like), at automated teller machines (ATMs), on the telephone, and/or the like. There are many organizations, such as large, complex, multinational corporations (including financial-services institutions), that operate and manage large, complex information technology (IT) ecosystems for both internal operations and for customer-facing activities, among other purposes. These ecosystems typically contain many different interoperating systems, servers, applications, interfaces, and the like. It is important to such organizations and their customers that these ecosystems operate reliably and effectively.

One ongoing, seemingly ever-present threat to the continued reliable and effective operation of these ecosystems—and indeed of many online systems and other resources—is the repeated attempts by nefarious actors to gain access (e.g., log in) to these systems, attempting to appear to such systems to be valid, authorized users. These malicious login attempts are carried out by both actual people and by programs (e.g., so-called "bots") that these bad actors create or at least use. These attackers, including both people and bots, are persistent, and continue to adjust their attack strategies in an effort to circumvent defensive measures. They often obtain lists that may or may not contain identifiers (e.g., usernames) of valid users of a system. Their attacks are accordingly often aimed at attempting to narrow such lists down to those identifiers that are associated with valid accounts, which the attackers then try to exploit in some manner. IT teams, fraud-prevention teams, and/or others count among their goals to protect their respective ecosystems, and thus their customers, against fraudulent access (e.g., login) attempts and other threats.

BRIEF DESCRIPTION OF THE DRAWINGS

A more detailed understanding may be had from the following description, which is presented by way of example in conjunction with the following drawings, in which like reference numerals are used across the drawings in connection with like elements.

DETAILED DESCRIPTION

Figure 1:
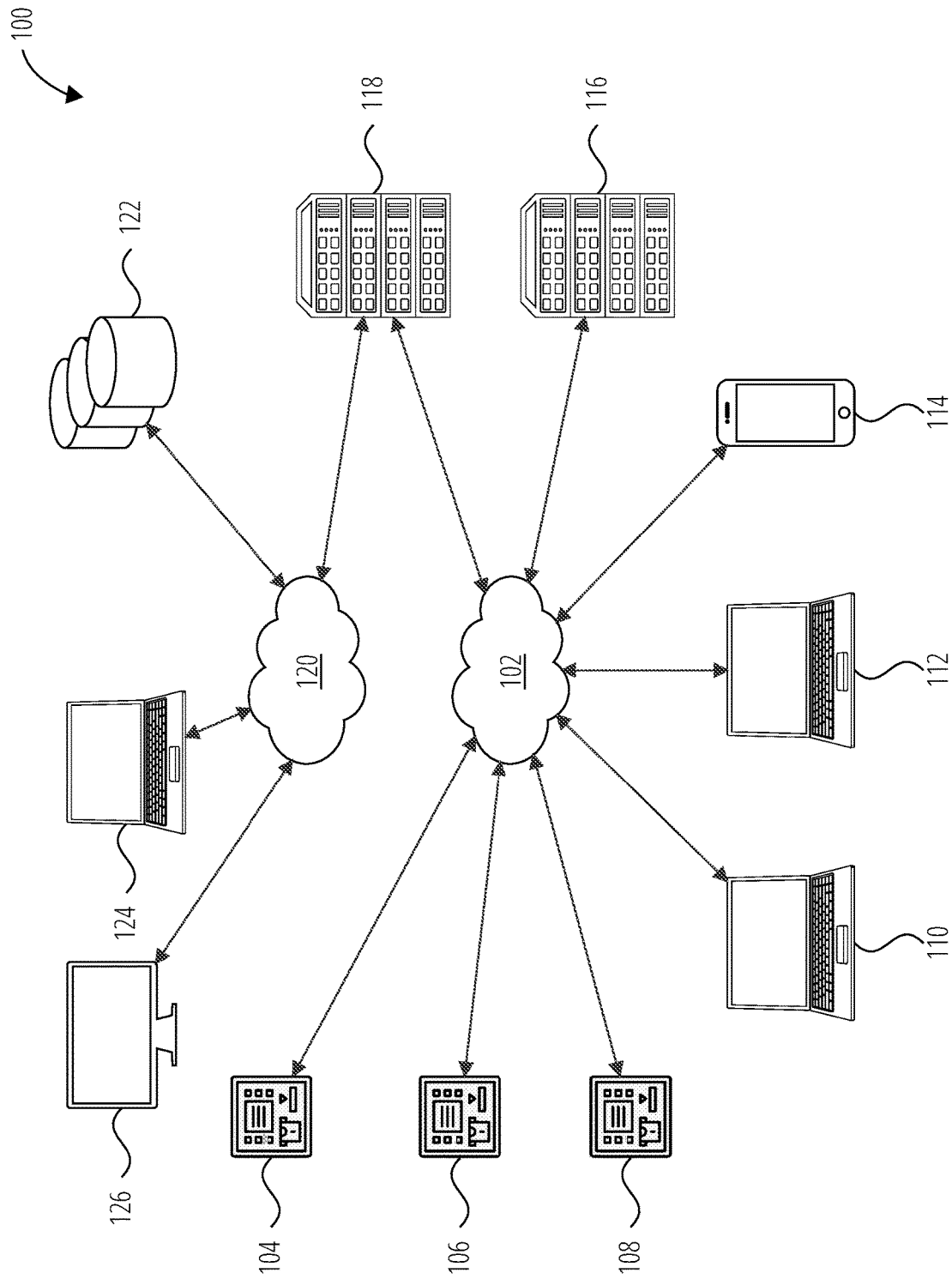
FIG. 1 illustrates an example network arrangement of an example financial-services institution, in accordance with at least one embodiment.

In addition to fraudulent access attempts, there are other types of cyberthreats as well. Some examples include malware, device-scanning software embedded in apps, device spoofing, phishing, and what are referred to at times as social engineering attacks, which often involve people placing calls to customer service call centers and posing as actual customers in an attempt to acquire personal information of the actual customers such as account numbers, account balances, passwords, and the like. Such attacks can also take the form of people placing calls to actual customers and posing as representatives of, e.g., a financial-services institution with which the customers have accounts in an attempt to acquire personal information from the customers themselves. There are numerous other types of cyberthreats as well.

Among other inspirations and motivations, the present systems and methods arise in part from the realization and recognition that, as a general matter, it is often the case that users (e.g., customers of a financial-services institution) do not realize the impact that their own actions can have on their own cybersecurity. Actions that can have a detrimental effect on a user's cybersecurity include clicking on links and opening attachments in phishing emails, password reuse across multiple online accounts, installing untrusted applications on their computer or mobile device, providing personal information over the phone to someone posing as a representative of a financial-services institution, and the like. Furthermore, it can be the case that data breaches of entities other than the user's financial-services institution can increase the cyberthreat risk to the user's information and accounts with that financial-services institution. Such can be the case if, as just one example, the same password (and even the same username) is used by the user for their online accounts with both the breached entity and the financial-services institution.

To address the above-described issues as well as others, disclosed herein are systems and methods for cyberthreat-risk education and awareness. Educating users about their level of cyberthreat risk and providing them with steps that they can take to lessen that risk can result in a reduction in successful fraudulent activity, and can give users confidence and satisfaction from taking an active role in protecting their own cybersecurity. One example embodiment takes the form of a method that includes determining a baseline cyberthreat-risk score for a user, and displaying the baseline cyberthreat-risk score via a user interface. The method also includes presenting at least one cyberthreat-education activity via the user interface, and receiving, via the user interface, at least one user input associated with the presented at least one cyberthreat-education activity. The method also includes generating an updated cyberthreat-risk score at least in part by updating the baseline cyberthreat-risk score based at least in part on the user input, and displaying the updated cyberthreat-risk score via the user interface.

Another embodiment takes the form of a system that includes at least one processor, and that also includes one or more non-transitory computer readable storage media (CRM) containing instructions executable by the at least one processor for causing the at least one processor to perform at least the operations that are listed in the preceding paragraph. Still another embodiment takes the form of one or more non-transitory CRMs containing instructions executable by at least one processor for causing the at least one processor to perform at least those operations.

Furthermore, a number of variations and permutations of the above-listed embodiments are described herein, and it is expressly noted that any variation or permutation that is described in this disclosure can be implemented with respect to any type of embodiment. For example, a variation or permutation that is primarily described in this disclosure in connection with a method embodiment could just as well be implemented in connection with a system embodiment and/or a CRM embodiment. Furthermore, this flexibility and cross-applicability of embodiments is present in spite of any slightly different language (e.g., processes, methods, methodologies, steps, operations, functions, and/or the like) that is used to describe and/or characterize such embodiments and/or any element or elements thereof.

FIG. 1 illustrates an example network arrangement 100 of an example financial-services institution. The network arrangement 100 is provided by way of example and not limitation, as a network arrangement of a given financial-services institution could have different numbers, types, and/or arrangements of devices, systems, networks, and/or the like. Moreover, the present disclosure is not limited in applicability to financial-services institutions, as embodiments of the present disclosure could be applied to many different types of organizations.

In the example network arrangement 100 that is depicted in FIG. 1, a number of different devices, systems, and the like are communicatively connected with a network 102 via respective communication links. These include an ATM 104, an ATM 106, an ATM 108, a laptop computer 110, a laptop computer 112, a mobile device 114, a server system 116, and a server system 118. In the depicted example, the server system 118 is also communicatively connected with a network 120. Also connected with the network 120 are a data-store system 122, a laptop computer 124, and a desktop computer 126. In at least one embodiment, only a subset of the devices, systems, and networks that are depicted in FIG. 1 are actually part of and managed by the aforementioned financial-services institution. An example such subset includes the ATM 104, the ATM 106, the ATM 108, the server system 118, the network 120, the data-store system 122, the laptop computer 124, and the desktop computer 126.

In an example scenario, the network 102 could be a data-communication network such as, including, or in communication with the Internet. The network 102 could operate according to a suite of communication protocols such the Transmission Control Protocol (TCP) over the Internet Protocol (IP) (collectively, TCP/IP), the User Datagram Protocol (UDP) over IP (UDP/IP), and/or others. Furthermore, the network 120 could be a private IP network operated by the aforementioned financial-services institution. In addition to other functions, the server system 118 could provide network-access-server (NAS) functions, gateway services, firewall protections, and/or the like between the network 102 and the network 120. Any of the devices in communication with the network 102, such as one or more of the ATM 104, the ATM 106, the ATM 108, the laptop computer 110, and/or the server system 116, as examples, could communicate via the network 102 and the server system 118 with one or more entities on the network 120, in some cases doing so via a virtual private network (VPN) and/or another type of secure-tunneling communication protocol, connection, and/or the like.

Any one or more of the ATM 104, the ATM 106, and the ATM 108 could be an ATM that provides conventional ATM-type services such as cash withdrawal, check deposit, account transfers, balance inquiries, bill pay, and/or the like. Users may access any one or more of the ATM 104, the ATM 106, and the ATM 108 using a secure card, a mobile device such as the mobile device 114, and/or the like, along with provided security credentials such as a personal identification number (PIN), password, passcode, and/or the like. In some implementations, biometric authentication is used by one or more of the ATM 104, the ATM 106, and the ATM 108.

In an embodiment, the server system 118 hosts a web-server application that provides an online-banking web-portal application that can be accessed by devices such as the laptop computer 110, the laptop computer 112, the mobile device 114, and/or the like. As another example, a mobile-banking application could be downloaded to, installed on, and executed by mobile devices such as the mobile device 114, to provide a user of the mobile device 114 access to one or more accounts managed by the aforementioned financial-services institution.

Moreover, although pictured as data-storage containers, the data-store system 122 could include, in addition to one or more data-storage devices, units, and/or the like, one or more database servers that operate to serve valid requests to carry out database operations with respect to the data-store system 122, where such database operations could include operations to store data, retrieve data, extract data, modify data, update data, remove data, and/or the like. Moreover, although the data-store system 122 is shown as being in a single network location in the network arrangement 100, the data-store system 122 could include multiple different data silos in multiple different geographic and/or network-topology locations.

Any of the devices, systems, and the like that are depicted in FIG. 1 and/or in any of the other figures could have an architecture similar to that described below in connection with the example machine 400 of FIG. 4 and could contain and execute software having an architecture similar to that described below in connection with the example software architecture 502 of FIG. 5. Moreover, any of the communication links depicted in FIG. 1 and/or in any of the other figures could be or include one or more wired-communication links (e.g., Ethernet, fiber optic, Universal Serial Bus (USB), and/or the like) and/or one or more wireless-communication links (e.g., Wi-Fi, LTE, NFC, Bluetooth, Bluetooth Low Energy, and/or the like). Any one or more of the communication links could include one or more intermediate devices such as one or more routers, bridges, servers, access points, base stations, and/or the like. Additionally, any communication link could include one or more VPNs and/or other tunneling-type connections.

Figure 2:
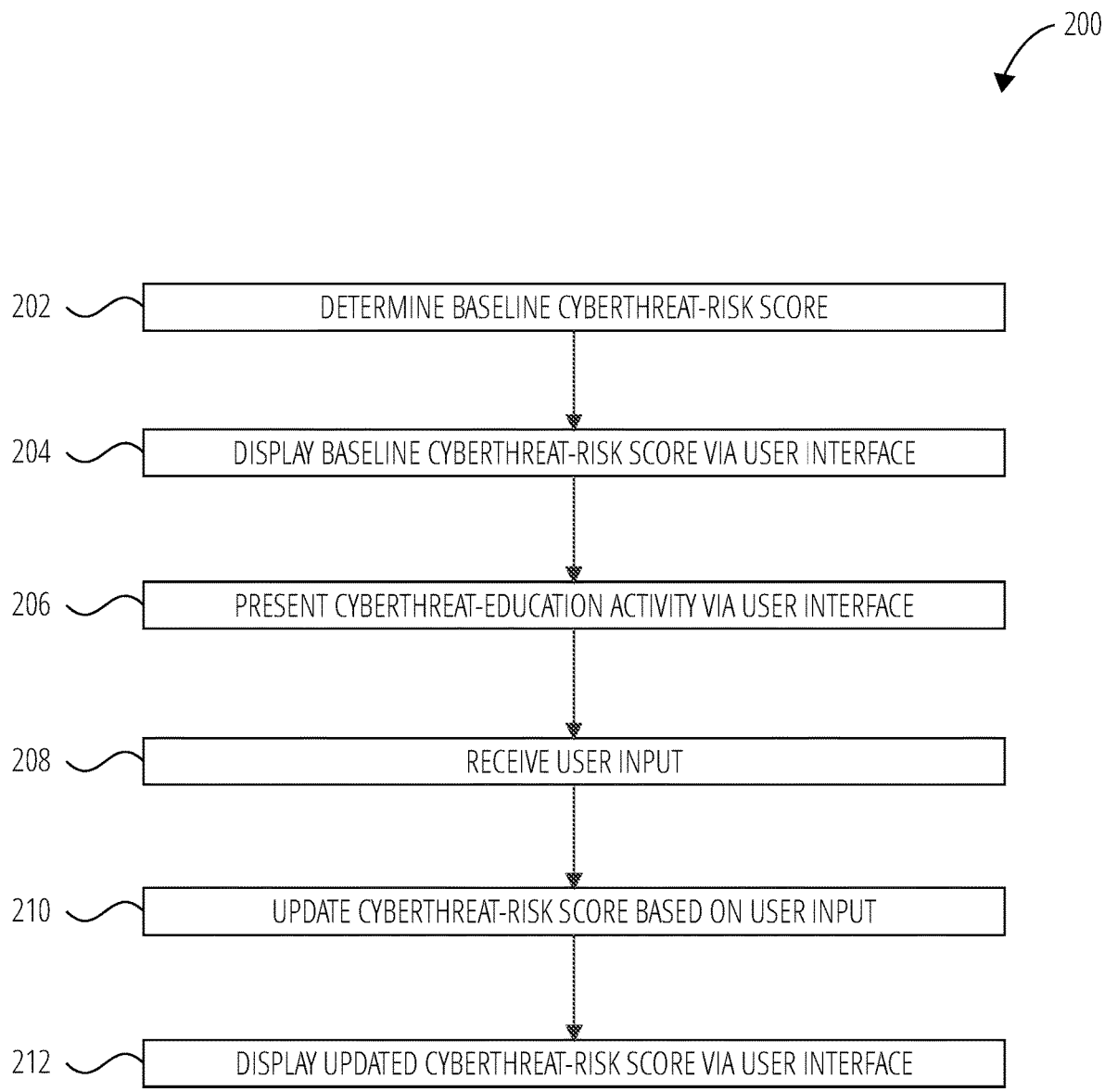
FIG. 2 illustrates an example method, in accordance with at least one embodiment.

FIG. 2 illustrates an example method 200 in accordance with at least one embodiment of the present disclosure. As a general matter, the method 200 could be performed by any one or any combination of devices, systems, and/or the like that are suitably equipped, programmed, and configured to perform the operations described herein. By way of example and not limitation, the method 200 is described herein as being performed by the mobile device 114, although it could be performed instead by, as examples, the laptop computer 110, the laptop computer 112, the server system 118, and/or by a combination of one or more devices and/or systems. It should be understood that the description below of the mobile device 114 performing the method 200 could include the mobile device 114 executing an app (e.g., an app provided by a financial-services institution) to perform the method 200.

Briefly stated, the operations of the method 200 are: determining a baseline cyberthreat-risk score for a user (operation 202); displaying the baseline cyberthreat-risk score via a user interface (operation 204); presenting at least one cyberthreat-education activity via the user interface (operation 206); receiving, via the user interface, at least one user input associated with the presented at least one cyberthreat-education activity (operation 208); generating an updated cyberthreat-risk score at least in part by updating the baseline cyberthreat-risk score based at least in part on the user input (operation 210); and displaying the updated cyberthreat-risk score via the user interface (operation 212). These operations are described more fully below.

As a general matter, embodiments of the present disclosure could be carried out at least in part via a web portal (e.g, a web site, web interface, and/or the like), a mobile app, a desktop app, and/or one or more other manners in which a user could interact with a user interface. In an embodiment, a user (e.g., a customer of a financial-services institution) is not enrolled by default for participation in having a cyberthreat-risk score be determined for them, taking actions to change that score, and so forth in accordance with the present disclosure. The user may be prompted upon logging in to a web portal, launching a mobile app, and/or the like to opt in to having a cyberthreat-risk score established for them and participating in the other aspects of the present disclosure. Such prompts could be displayed every time a user logs in or activates their mobile app; alternatively, such prompts could be displayed once a day, once a week, every third login or app launch, and/or according to some other frequency. In addition to or instead of being prompted, a user-interface element (e.g., a button or link) could be displayed to the user via the web portal or app, such that the user could click on that and pursue it if they were interested in doing so. Clicking on or otherwise selecting such a user-interface element could result in the user being presented a page or series of pages that explain the cyberthreat-risk score and related activities as described herein. If a user does opt in, the mobile device 114 (in this described example) may then carry out the method 200, as described below.

At operation 202, the mobile device 114 determines a baseline cyberthreat-risk score for a user. In various different embodiments, the mobile device 114 may do so on its own or may upload information to, e.g., the server system 118, which may perform some or all of operation 202. The mobile device 114 may download information from one or more entities such as the server system 118 for use in determining the baseline cyberthreat-risk score for the user. As used herein, for illustration and not by way of limitation, a lower cyberthreat-risk score is associated with being less at risk of being harmed by cyberthreats, whereas a higher cyberthreat-risk score is associated with being more at risk of being harmed by cyberthreats. This is simply a chosen convention, however, and other conventions could be used instead. For example, in other embodiments, the score could be cast as a cyberthreat-safety score or the like, in which case a higher score might be associated with being less at risk of being harmed by cyberthreats.

The mobile device 114 may determine the baseline cyberthreat-risk score for the user based on one or more of a wide variety of inputs. As one example, the mobile device 114 could present survey questions via the user interface, where the questions are related to the user's online accounts, online habits, cyberthreat knowledge, and/or the like. The mobile device 114 may receive answers to these survey questions and may determine the baseline cyberthreat-risk score for the user based at least in part on the one or more cyberthreat-survey answers. In general, the cyberthreat-risk score could be any number in a range, e.g., from 0 through 100, where, again, in this illustration, a lower score corresponds to lower risk. A user's score could start out at, e.g., 50, and then be decreased based on positive actions, answers, events, and/or the like, and could be increased based on actions, answers, events, and/or the like that are associated with more vulnerability to cyberthreats. Certainly other approaches could be used as well.

In some embodiments, the mobile device 114 bases its determination of the user's baseline cyberthreat-risk score on the set of apps that are installed on the mobile device 114 (or other user device in other examples). The mobile device 114 may query its operating system for a list of installed apps. The mobile device 114 may reduce the baseline cyberthreat-risk score based on the list of installed apps including certain apps such as anti-virus apps, and may increase the baseline cyberthreat-risk score based on the list of installed apps including apps known to be risky or untrusted. The user may be prompted to uninstall one or more risky apps. In other embodiments, the mobile device 114 may derive a single value by which to reduce or increase the baseline cyberthreat-risk score based on the set of all installed apps, and then apply that value to the baseline cyberthreat-risk score. Other approaches could be used as well. The baseline cyberthreat-risk score may be reduced if the mobile device 114 has been updated to the latest version of one or more installed apps (and/or an operating system of the mobile device 114), and instead may be increased if that is not the case.

In some embodiments, the baseline cyberthreat-risk score is based at least in part on the results of a searching or scanning process of web sites, the dark web, and/or the like, to identify sites at which the user's personal information is found. In an embodiment, the dark web is a subsection of the world wide web that is not visible to search engines and as such cannot be and is not indexed by search engines. The user's personal information could include the user's social security number, usernames, passwords, account numbers, credit card numbers, driver's license number, and/or the like. If the user's personal information is found to be present on sites that are known to be risky sites, this could be used to increase the baseline cyberthreat-risk score. This searching or scanning process could be carried out at off hours, overnight, and/or the like, and could be done by, e.g., the server system 118, from which the mobile device 114 could download the relevant results.

The browsing history of one or more web browsers installed on the mobile device 114 is used in some embodiments to derive the baseline cyberthreat-risk score for the user. If the one or more browsing histories include entries related to sites known to be risky, this could also be used to increase the baseline cyberthreat-risk score. If that is not the case, the absence of such sites in one or more browsing histories could be used as a factor to reduce the baseline cyberthreat-risk score for the user.

As described above, in embodiments of the present disclosure, users are not enrolled by default into having a cyberthreat-risk score determined for them and participating in the various activities as described herein. Moreover, in embodiments, users can further control the extent to which their personal data is used by specifically opting in with respect to aspects such as their installed application set, browsing history, any one or more of the other factors described herein, and/or the like being used in the determination of their baseline cyberthreat-risk score.

Another input to the determination of a baseline cyberthreat-risk score in some embodiments is the degree of password reuse detected across multiple online accounts associated with the user. The mobile device 114 could include a password-storage-and-management function, and the baseline cyberthreat-risk score could be increased if the user has used the same password at more than a threshold number of sites, and could instead be decreased if the user has put in place unique passwords for all or most of the user's online accounts. This password-storage-and-management function could be a functional part of the above-described financial-services-institution mobile app, or instead could be a standalone app, a functional part of an operating system, a functional part of a web browser, and/or the like. If a high degree of password reuse is detected, the mobile device 114 may prompt the user with opportunities to change one or more passwords for one or more online accounts. If the user does so, this may be used as a basis to reduce the baseline cyberthreat-risk score.

On a somewhat similar note, in some embodiments, the mobile device 114 checks (with reference to local data and/or downloaded data) whether a username that the user has established for the mobile app of the financial-services institution matches the initial part of an email address associated with the user. This in general is not considered to be a best practice, as it generally makes a cyber attacker's task easier. If there is such a match, this could be a basis for increasing the baseline cyberthreat-risk score. If, however, there is not such a match, the lack of a match could be a basis for reducing the baseline cyberthreat-risk score. If there is match, a recommendation could be displayed to the user that they change their username to a non-matching character string. If the user does so, this may be used as a basis to reduce the baseline cyberthreat-risk score.

In some embodiments, the system may increase the baseline cyberthreat-risk score if the mobile device 114 is a new device for the user. A new device may be considered less trustworthy until it is established as being a trusted device. Two-factor authentication could be used to establish the mobile device 114 as being a trusted device. A one-time password could be emailed or texted to the user, as examples. Once the mobile device 114 is established as a trusted device, this may be used as a basis for reducing the cyberthreat-risk score.

In embodiments of the present disclosure, the baseline cyberthreat-risk score is determined (e.g., calculated) for the user based on one or more of the factors listed above. In some embodiments, all of the above-listed factors are used. In other embodiments, one or more but less than all of the above-listed factors are used. Moreover, as described above, in various different embodiments the user may be asked to specifically opt in on a factor-by-factor basis to the use of their personal data in such calculations.

Figure 3:
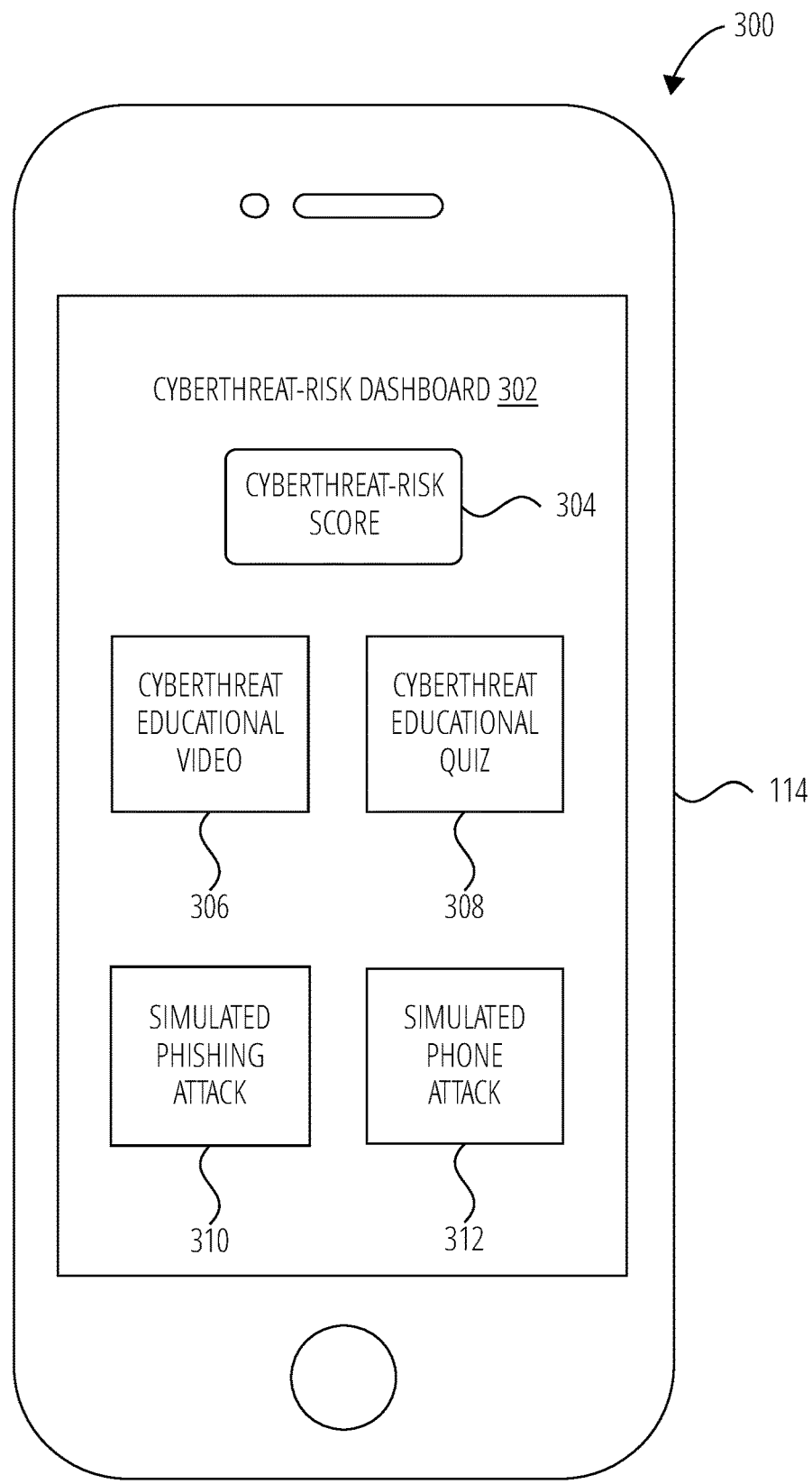
FIG. 3 illustrates an example user interface, in accordance with at least one embodiment.

At operation 204, the mobile device 114 displays the baseline cyberthreat-risk score via a user interface. As described, in various different embodiments, the user interface may be provided via a web portal, a desktop application, a mobile app, and/or the like. In this described example, a mobile app being executed by the mobile device 114 is used to display the user interface. With reference to FIG. 3, an example user interface 300 is shown as being displayed on the mobile device 114. In the depicted example, the user interface 300 includes a cyberthreat-risk dashboard 302, which itself includes a score element 304, within which a current cyberthreat-risk score for the user is displayed.

In an embodiment, upon the baseline cyberthreat-risk score having been determined, the user is presented with a welcome screen that provides the baseline cyberthreat-risk score and a list of items that the user may select to learn about threats and to learn about steps that may be taken to lower the cyberthreat-risk score. Some examples of such items are described herein. In some embodiments, the cyberthreat-risk dashboard 302 displays a variety of current cyberthreats (e.g., known phishing attacks and/or other fraudulent activity aimed at personal data maintained for individuals by institutions such as the social security administration (SSA), the Internal Revenue Service (IRS), and/or the like). The cyberthreat-risk dashboard 302 may show breaches at other sites and/or entities. The information displayed on the cyberthreat-risk dashboard 302 may be customized based on information specific to that user, where that information could pertain to accounts, applications, services, and/or the like that are used by the user.

At operation 206, the mobile device 114 presents at least one cyberthreat-education activity via the user interface. At operation 208, the mobile device 114 receives, via the user interface, at least one user input associated with the presented at least one cyberthreat-education activity. At operation 210, the mobile device 114 generates an updated cyberthreat-risk score at least in part by updating the baseline cyberthreat-risk score based at least in part on the user input. At operation 212, the mobile device 114 displays the updated cyberthreat-risk score via the user interface. As described below, operation 206 through operation 212 could happen iteratively. That is, as one or more user-interface elements are presented via the cyberthreat-risk dashboard 302 and explored, experienced, and completed by the user, the mobile device 114 may revise the current cyberthreat-risk score for the user and display that revised value in the score element 304 on the cyberthreat-risk dashboard 302.

With respect to operation 206 as a general matter, the mobile device 114 may present suggestions, recommendations, opportunities, and/or the like of ways in which the user can improve their baseline cyberthreat-risk score. The cyberthreat-risk dashboard 302 could include educational videos, quizzes, games, simulated attacks, and/or the like. Some examples of these are described herein. The cyberthreat-risk dashboard 302 might also display, if necessary, a recommendation that the user update to the latest version of one or more mobile apps and/or the operating system (e.g., software version) of the mobile device 114.

As shown by way of example in FIG. 3, the cyberthreat-risk dashboard 302 could include an educational-video element 306 that is selectable by the user to play an educational video about one or more types of cyberthreats. The user could, after watching the video, provide an indication of that completion via the cyberthreat-risk dashboard 302, and their cyberthreat-risk score could be correspondingly reduced. In some embodiments, the user input received at operation 208 is a command to play a corresponding educational video, and the mobile device 114 detects when the video is complete.

As another example, the cyberthreat-risk dashboard 302 could include an educational-quiz element 308 that is selectable by the user to activate a cyberthreat educational quiz including one or more questions (e.g., multiple choice, fill-in-the-blank, and/or the like) about best practices, general knowledge, and/or the like related to cybersecurity. The user may input answers to the provided questions, and correct answers may be used as a basis to lower the user's cyberthreat-risk score. In some embodiments, incorrect answers may be used as a basis to increase the user's cyberthreat-risk score; in other embodiments, the user is prompted to try again and/or is presented with educational information that explains what the correct answer is and why that answer is correct. Upon acknowledging such educational information via the user interface, the user's cyberthreat-risk score may be reduced.

In some embodiments, the cyberthreat-risk dashboard 302 includes one or more user-interface elements that are selectable by the user for launching a simulated cyberthreat with which the user can interact and that the user can attempt to handle (in a safe, simulated environment). The user may input one or more responses to such a simulated cyberthreat, and these responses could be used as a basis to either increase or decrease the current cyberthreat-risk score for the user. Some example simulated cyberthreats are described below.

As one example of a simulated cyberthreat, as shown in FIG. 3, the cyberthreat-risk dashboard 302 may include a simulated-phishing-attack element 310 that is selectable by the user to launch a simulated phishing attack involving one or more simulated email messages. The user may be presented with some email messages that are benign (in which, e.g., the hyperlinks point to valid webpages associated with legitimate organizations, which the user can be instructed to examine via, e.g., mouseover actions, right-click actions, and/or the like). The user may also or instead be presented with a simulated phishing email (in which, e.g., the hyperlinks appear legitimate but, e.g., a mouseover action or the like reveals that the links do not point to valid webpages associated with legitimate organizations). The user may be able to click on one or more of the links, which is generally ill-advised and may accordingly increase their cyberthreat-risk score. The simulated phishing email may have one or more attachments. The user may be able to attempt to open one or more attachments, which is also generally ill-advised and may therefore also increase their cyberthreat-risk score. The user may also be given the option to forward the email to a particular valid email address so as to report the simulated phishing email message as being a cyberthreat. Exercising this latter option may reduce the user's current cyberthreat-risk score. The simulation may also include visual and/or audio feedback regarding the user's selections.

As another example of a simulated cyberthreat, as is also shown in FIG. 3, the cyberthreat-risk dashboard 302 may include a simulated-phone-attack element 312 that is selectable by the user to launch a simulated phone call. In an embodiment, audio clips may be played for the user, where those audio clips simulate what a user might hear if a cyberattacker placed a phone call to the user and tried to convince the user that the call was from a legitimate source, such as from the user's financial-services institution. The simulated phone call may include an audio clip that asks the user to provide their full account number, their password, their social security number, and/or one or more other pieces of sensitive personal data. The user could speak responses into a microphone (of, e.g., a headset), type responses into a response blank on the user interface, select from multiple-choice options as to how to respond, and/or the like. If the user agrees to provide sensitive personal data, this could be used as a basis to increase their cyberthreat-risk score, and/or corrective instructions could be presented to the user.

If, on the other hand, the user refuses to provide sensitive personal data, this could be used as a basis to decrease their cyberthreat-risk score. In an embodiment that involved the user speaking responses, any recordings of such responses would be automatically deleted to protect the user's cybersecurity.

In some embodiments, a simulated cyberthreat is presented unprompted via the user interface. In the context of embodiments in which the user interface is presented via the mobile device 114, a notification such as a badge, banner, alert, text message, and/or the like could be presented on the mobile device 114 when, e.g., the above-mentioned financial-services-institution mobile app (e.g., the cyberthreat-risk dashboard 302) is not in the foreground of the mobile device 114. Upon clicking on such a notification, a simulated cyberthreat may be presented to the user (via, e.g., the cyberthreat-risk dashboard 302). Thus, in some embodiments, the user is tested with simulated cyberthreats at times that may seem random to the user. The user's inputs in response to the simulated cyberthreats may be evaluated and the user's cyberthreat-risk score may be accordingly adjusted as described in the present disclosure.

In still another example of a simulated cyberthreat, an email message may be sent to an email account of the user. Such an email account may be entirely separate from the herein-described mobile app that includes the cyberthreat-risk dashboard 302. The user may be able to manage that email account via one or more email clients on the mobile device 114 and/or via one or more email clients on one or more other devices. The email message may appear to originate with the user's financial-services institution. The email message may contain links that appear legitimate but, e.g., a mouseover action or the like reveals that the links do not point to valid webpages associated with that financial-services institution. The email message may also have one or more attachments. Selection of a hyperlink in the email message and/or opening of an attachment to the email message may result in the presentation via a web browser or a mobile app of an educational page to let the user know that the email message is a simulated cyberthreat. An attachment could include executable code to present such a page.

Selection of a hyperlink and/or opening an attachment in the email message could result in an increase of the user's cyberthreat-risk score. Instead or in addition, the user could be prompted via, e.g., the mobile app with an opportunity to review one or more educational pages and/or one or more educational videos and thereby either maintain or even lower their cyberthreat-risk score. In an embodiment, forwarding the email message to an email address provided by the financial-services institution for reporting suspected phishing emails could be used as a basis to reduce the user's cyberthreat-risk score. In some embodiments, the expiration of a timeout period after the simulated phishing email message was sent to the user, where the user had not clicked on any links in the message or opened any attachments to the message could be used as a basis to lower the user's cyberthreat-risk score. This could occur if, e.g., the user simply deleted or otherwise ignored the message.

In some embodiments, upon one or more adjustments being made to the user's cyberthreat-risk score, the user is presented with an explanation of the reason for the one or more adjustments. This explanation could be contained in an email message that is sent to the user, displayed via the cyberthreat-risk dashboard 302, and/or presented in one or more other ways.

The user may be provided incentives for participating in having a cyberthreat-risk score established and/or for completing activities and accordingly reducing their cyberthreat-risk score. In some embodiments, one or more rewards are conveyed to the user based at least in part on their updated cyberthreat-risk score. Thus, e.g., if the user lowers their cyberthreat-risk score to a certain threshold and/or by a certain threshold amount, the user may be awarded a gift card and/or the like. Other rewards and incentives (e.g., earning higher interest rates on accounts) could be awarded instead or in addition.

In some embodiments, a user's current cyberthreat-risk score is used as a basis to determine a type of authentication protocol that is required of the user to, e.g., log in to their account with the financial-services institution. Thus, for example, if a user's cyberthreat-risk score is low enough (e.g., at or below a particular threshold), the user may not be asked to complete 2-factor authentication, or may be asked to do so less often than other users, among other options. In contrast, as another example, if a user's cyberthreat-risk score is high enough (e.g., at or above a particular threshold), the user may be asked to complete 2-factor authentication each time they log in, or may be asked to do so more often than other users. Thus, as a general matter, a user's authentication protocol could be selected based at least in part on their current cyberthreat-risk score, which may be an indication of how savvy they are (or are not) when it comes to handling cyberthreats.

A user's current cyberthreat-risk score is used as a basis in some embodiments for selection of a transaction-security protocol that is applied to the user for at least one monetary range of transactions. Such transactions could include online purchases, point-of-sale purchases, transfers of funds between accounts, payment of bills to external entities, transfers (e.g., wires) of funds to external accounts, and/or the like. Thus, if a user's cyberthreat-risk score is at or below a given threshold, one or more such transactions may be permitted up to a certain monetary amount with less security required (e.g., no 2-factor authentication) than might be required if the user's cyberthreat-risk score were above that threshold (or at or above a different, higher threshold).

In some instances, if the monetary amount of a transaction is high enough (e.g., in absolute amount, as a percentage of their current account balance, and/or the like), more stringent security measures may be implemented regardless of user's cyberthreat-risk score. Moreover, if a user's cyberthreat-risk score is high enough (e.g., at or above a given threshold), more stringent security measures (e.g., 2-factor authentication) may be required either regardless of the amount of the transaction or at least for monetary ranges that span lower monetary amounts than the amounts at which such security measures might be required for other users. Other heightened security measures in addition to or instead of 2-factor authentication could be imposed in any of these examples. Such measures may include phone calls being placed to the user, biometric authentication, and/or the like.

Embodiments of the present disclosure provide technical improvements over prior implementations in a number of different ways. As one example, the operation of a user device such as the mobile device 114 is improved over time by making the user device less susceptible to technical problems—such as malware and the like—that are caused by the user browsing to risky sites, downloading and installing risky apps, clicking on harmful links in email messages, opening harmful attachments to email messages, and the like. The mobile device 114 will also function better in example situations in which risky apps are identified and uninstalled in accordance with embodiments of the present disclosure. That is, as the user's cybersecurity habits improve as a result of embodiments of the present disclosure, it becomes less likely that the user device will incur the technical problems caused by malicious actors.

Furthermore, embodiments of the present disclosure provide a useful technical tool by which users can improve their cybersecurity habits. Embodiments that provide users the opportunity to interactively engage in handling simulated cyberthreats as described herein provide a useful, technical, educational tool that addresses the technical problems caused to user devices by malicious sites, activities, apps, attacks, and the like. Embodiments of the present disclosure therefore provide a better-functioning device at least in that the device becomes, e.g., less susceptible to being hacked by attackers than devices that do not implement embodiments of the present disclosure.

Furthermore, some embodiments involve selecting an authentication protocol for the user based at least in part on the updated cyberthreat-risk score of the user. An authentication protocol is an inherently technical process in which the user is prompted and required in an automated way to provide, e.g., some combination of a correct password, a biometric authentication such as a valid fingerprint, a one-time password from a 2-factor authentication system, and/or the like. Embodiments that include selection of the set of these authentication options that are asked of the user based at least in part on the user's updated cyberthreat-risk score provide a technical, user-interface-based tool by which a user can affect the set of authentication steps that are imposed on the user. Such embodiments provide a better-functioning device as compared with prior implementations at least in that technical modules (e.g., simulated cyberthreats) are provided via a user interface, and the user input received in connection with such technical modules programmatically impact the automated authentication protocol to which the user will be subjected. This is also the case in embodiments in which a transaction-security protocol is programmatically selected for at least one monetary range of transactions based at least in part on the updated cyberthreat-risk score of the user.

Figure 4:
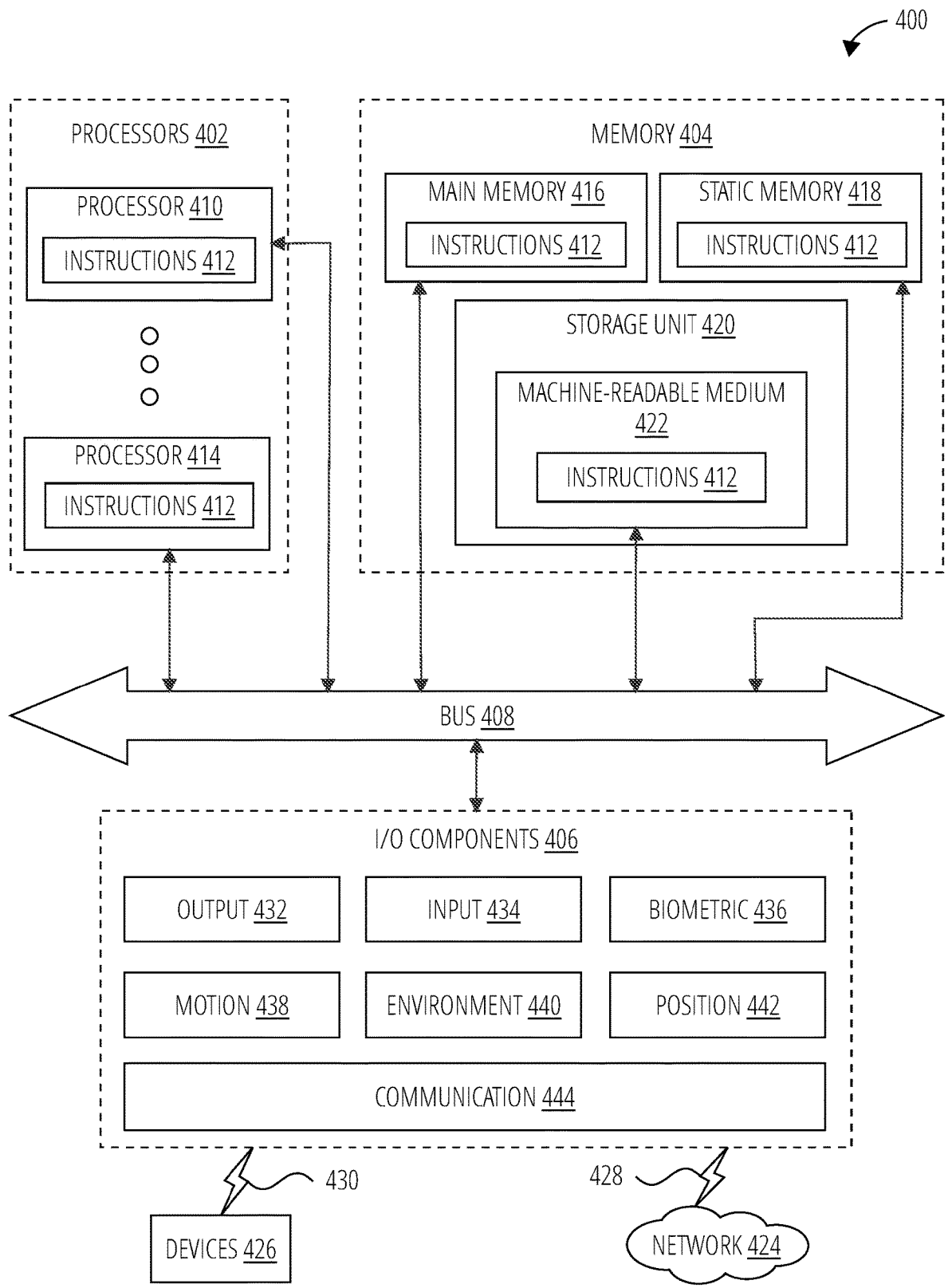
FIG. 4 illustrates a machine in the form of a computer system within which a set of instructions may be executed for causing the machine to perform any one or more of the methodologies discussed herein, in accordance with at least one embodiment.

FIG. 4 is a diagrammatic representation of a machine 400 within which instructions 412 (e.g., software, a program, an application, an applet, an app, and/or other executable code) for causing the machine 400 to perform any one or more of the methodologies discussed herein may be executed. For example, the instructions 412 may cause the machine 400 to execute any one or more of the methods described herein. The instructions 412 transform the general, non-programmed machine 400 into a particular machine 400 programmed to carry out the described and illustrated functions in the manner described. The machine 400 may operate as a standalone device or may be coupled (e.g., networked) to other machines. In a networked deployment, the machine 400 may operate in the capacity of a server machine or a client machine in a server-client network environment, or as a peer machine in a peer-to-peer (or distributed) network environment. The machine 400 may be or include, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, and/or any other machine capable of executing the instructions 412, sequentially or otherwise, that specify actions to be taken by the machine 400. Further, while only a single machine 400 is illustrated, the term "machine" shall also be taken to include a collection of machines that individually or jointly execute the instructions 412 to perform any one or more of the methodologies discussed herein.

The machine 400 may include processors 402, memory 404, and I/O components 406, which may be configured to communicate with each other via a bus 408. In an example embodiment, the processors 402 (e.g., a central processing unit (CPU), a Reduced Instruction Set Computing (RISC) processor, a Complex Instruction Set Computing (CISC) processor, a graphics processing unit (GPU), a digital signal processor (DSP), an application-specific integrated circuit (ASIC), a radio-frequency integrated circuit (RFIC), another processor, and/or any suitable combination thereof) may include, for example, a processor 410 and a processor 414 that execute the instructions 412. The term "processor" is intended to include multi-core processors that may include two or more independent processors (sometimes referred to as "cores") that may execute instructions contemporaneously. Although FIG. 4 shows multiple processors 402, the machine 400 may include a single processor with a single core, a single processor with multiple cores (e.g., a multi-core processor), multiple processors with a single core, multiple processors with multiples cores, or any combination thereof.

The memory 404 includes a main memory 416, a static memory 418, and a storage unit 420, all accessible to the processors 402 via the bus 408. The memory 404, the static memory 418, and/or the storage unit 420 may store the instructions 412 embodying any one or more of the methodologies or functions described herein. The instructions 412 may also or instead reside, completely or partially, within the main memory 416, within the static memory 418, within machine-readable medium 422 within the storage unit 420, within at least one of the processors 402 (e.g., within the processor's cache memory), and/or any suitable combination thereof, during execution thereof by the machine 400.

The I/O components 406 may include a wide variety of components to receive input, produce and/or provide output, transmit information, exchange information, capture measurements, and/or the like. The specific I/O components 406 that are included in a particular instance of the machine 400 will depend on the type of machine. For example, portable machines such as mobile phones may include a touch input device or other such input mechanisms, while a headless server machine may not include such a touch input device. It will be appreciated that the I/O components 406 may include many other components that are not shown in FIG. 4. In various example embodiments, the I/O components 406 may include output components 432 and input components 434. The output components 432 may include visual components (e.g., a display such as a plasma display panel (PDP), a light emitting diode (LED) display, a liquid crystal display (LCD), a projector, and/or a cathode ray tube (CRT)), acoustic components (e.g., speakers), haptic components (e.g., a vibratory motor, resistance mechanisms), other signal generators, and so forth. The input components 434 may include alphanumeric input components (e.g., a keyboard, a touchscreen configured to receive alphanumeric input, a photo-optical keyboard, and/or other alphanumeric input components), point-based input components (e.g., a mouse, a touchpad, a trackball, a joystick, a motion sensor, and/or one or more other pointing instruments), tactile input components (e.g., a physical button, a touchscreen that is responsive to location and/or force of touches or touch gestures, and/or one or more other tactile input components), audio input components (e.g., a microphone), and/or the like.

In further example embodiments, the I/O components 406 may include biometric components 436, motion components 438, environmental components 440, and/or position components 442, among a wide array of other components. For example, the biometric components 436 may include components to detect expressions (e.g., hand expressions, facial expressions, vocal expressions, body gestures, eye tracking, and/or the like), measure biosignals (e.g., blood pressure, heart rate, body temperature, perspiration, brain waves, and/or the like), identify a person (by way of, e.g., voice identification, retinal identification, facial identification, fingerprint identification, electroencephalogram-based identification, and/or the like), and/or the like. The motion components 438 may include acceleration sensor components (e.g., an accelerometer), gravitation sensor components, rotation sensor components (e.g., a gyroscope), and so forth. The environmental components 440 may include, for example, illumination sensor components (e.g., a photometer), temperature sensor components (e.g., one or more thermometers), humidity-sensor components, pressure-sensor components (e.g., a barometer), acoustic-sensor components (e.g., one or more microphones), proximity-sensor components (e.g., infrared sensors that detect nearby objects), gas sensors (e.g., gas-detection sensors to detection concentrations of hazardous gases for safety or to measure pollutants in the atmosphere), and/or other components that may provide indications, measurements, signals, and/or the like that correspond to a surrounding physical environment. The position components 442 may include location-sensor components (e.g., a global positioning system (GPS) receiver), altitude-sensor components (e.g., altimeters or barometers that detect air pressure from which altitude may be derived), orientation-sensor components (e.g., magnetometers), and/or the like.

Communication may be implemented using a wide variety of technologies. The I/O components 406 may further include communication components 444 operable to communicatively couple the machine 400 to a network 424 and/or devices 426 via a coupling 428 and/or a coupling 430, respectively. For example, the communication components 444 may include a network-interface component or another suitable device to interface with the network 424. In further examples, the communication components 444 may include wired-communication components, wireless-communication components, cellular-communication components, Near Field Communication (NFC) components, Bluetooth (e.g., Bluetooth Low Energy) components, Wi-Fi components, and/or other communication components to provide communication via one or more other modalities. The devices 426 may include one or more other machines and/or any of a wide variety of peripheral devices (e.g., a peripheral device coupled via a universal serial bus (USB) connection).

Moreover, the communication components 444 may detect identifiers or include components operable to detect identifiers. For example, the communication components 444 may include radio frequency identification (RFID) tag reader components, NFC-smart-tag detection components, optical-reader components (e.g., an optical sensor to detect one-dimensional bar codes such as Universal Product Code (UPC) bar codes, multi-dimensional bar codes such as Quick Response (QR) codes, Aztec codes, Data Matrix, Dataglyph, MaxiCode, PDF417, Ultra Code, UCC RSS-2D bar codes, and/or other optical codes), and/or acoustic-detection components (e.g., microphones to identify tagged audio signals). In addition, a variety of information may be derived via the communication components 444, such as location via Internet Protocol (IP) geolocation, location via Wi-Fi signal triangulation, location via detecting an NFC beacon signal that may indicate a particular location, and/or the like.

One or more of the various memories (e.g., the memory 404, the main memory 416, the static memory 418, and/or the memory of the processors 402) and/or the storage unit 420 may store one or more sets of instructions and data structures (e.g., software) embodying or used by any one or more of the methodologies or functions described herein. These instructions (e.g., the instructions 412), when executed by processors 402, cause various operations to implement the disclosed embodiments.

The instructions 412 may be transmitted or received over the network 424, using a transmission medium, via a network-interface device (e.g., a network-interface component included in the communication components 444) and using any one of a number of well-known transfer protocols (e.g., the Session Initiation Protocol (SIP), the hypertext transfer protocol (HTTP), and/or the like). Similarly, the instructions 412 may be transmitted or received using a transmission medium via the coupling 430 (e.g., a peer-to-peer coupling) to the devices 426.

Figure 5:
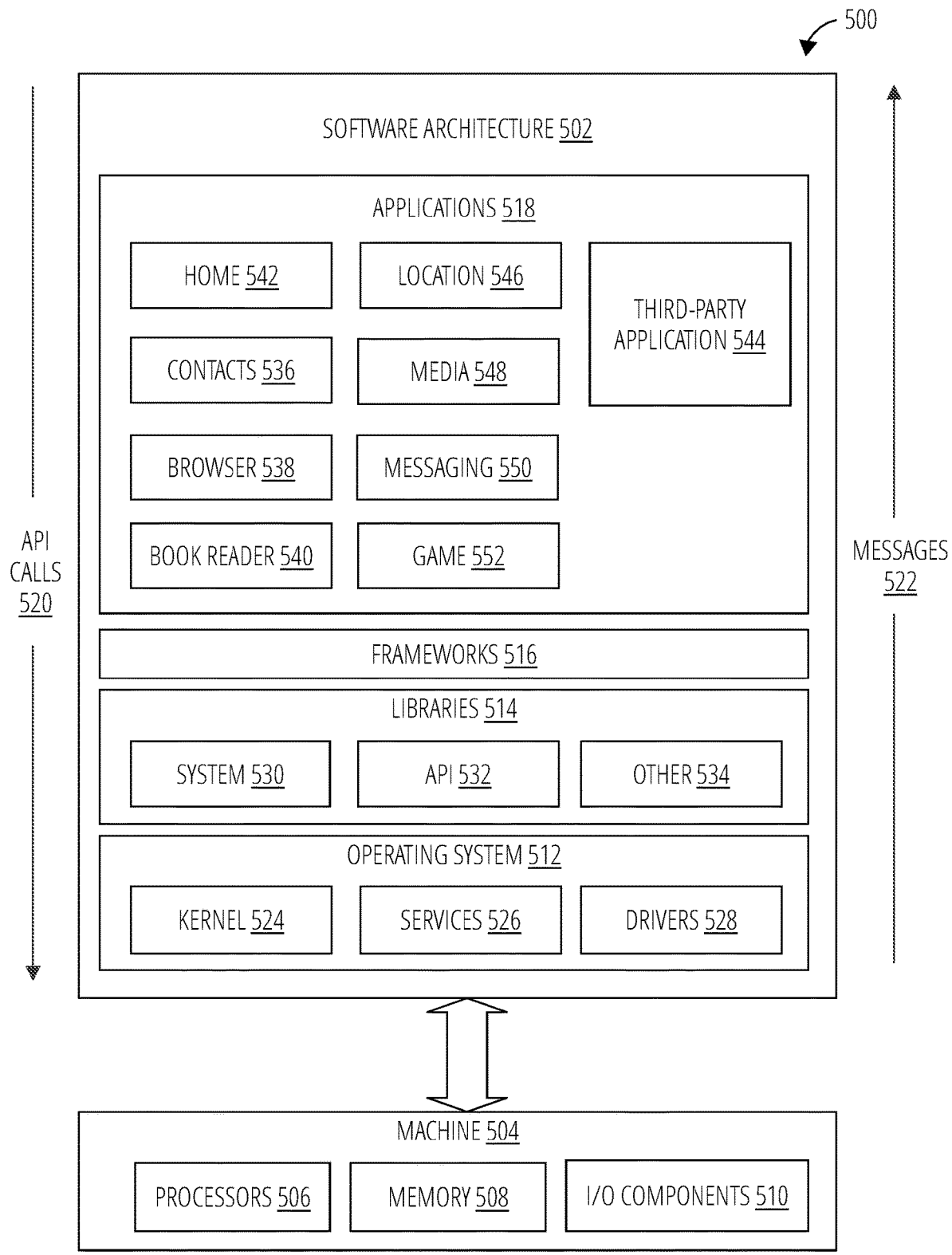
FIG. 5 illustrates a software architecture within which one or more embodiments of the present disclosure may be implemented, in accordance with at least one embodiment.

FIG. 5 is a block diagram 500 illustrating a software architecture 502, which can be installed on any one or more of the devices described herein. For example, the software architecture 502 could be installed on any device or system that is arranged similar to the machine 400 of FIG. 4. The software architecture 502 is supported by hardware such as a machine 504 that includes processors 506, memory 508, and I/O components 510. In this example, the software architecture 502 can be conceptualized as a stack of layers, where each layer provides a particular functionality. The software architecture 502 includes layers such an operating system 512, libraries 514, frameworks 516, and applications 518. Operationally, using one or more application programming interfaces (APIs), the applications 518 invoke API calls 520 through the software stack and receive messages 522 in response to the API calls 520.

The operating system 512 manages hardware resources and provides common services. The operating system 512 includes, for example, a kernel 524, services 526, and drivers 528. The kernel 524 acts as an abstraction layer between the hardware and the other software layers. For example, the kernel 524 may provide memory management, processor management (e.g., scheduling), component management, networking, and/or security settings, in some cases among other functionality. The services 526 can provide other common services for the other software layers. The drivers 528 are responsible for controlling or interfacing with the underlying hardware. For instance, the drivers 528 can include display drivers, camera drivers, Bluetooth or Bluetooth Low Energy drivers, flash memory drivers, serial communication drivers (e.g., USB drivers), Wi-Fi drivers, audio drivers, power management drivers, and/or the like.

The libraries 514 provide a low-level common infrastructure used by the applications 518. The libraries 514 can include system libraries 530 (e.g., C standard library) that provide functions such as memory-allocation functions, string-manipulation functions, mathematic functions, and/or the like. In addition, the libraries 514 can include API libraries 532 such as media libraries (e.g., libraries to support presentation and/or manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), Portable Network Graphics (PNG), and/or the like), graphics libraries (e.g., an OpenGL framework used to render in two dimensions (2D) and three dimensions (3D) in a graphic content on a display), database libraries (e.g., SQLite to provide various relational-database functions), web libraries (e.g., WebKit to provide web-browsing functionality), and/or the like. The libraries 514 can also include a wide variety of other libraries 534 to provide many other APIs to the applications 518.

The frameworks 516 may provide a high-level common infrastructure that is used by the applications 518. For example, the frameworks 516 may provide various graphical user interface (GUI) functions, high-level resource management, high-level location services, and/or the like. The frameworks 516 can provide a broad spectrum of other APIs that can be used by the applications 518, some of which may be specific to a particular operating system or platform.

Purely as representative examples, the applications 518 may include a home application 542, a contacts application 536, a browser application 538, a book-reader application 540, a location application 546, a media application 548, a messaging application 550, a game application 552, and/or a broad assortment of other applications generically represented in FIG. 5 by a third-party application 544. The applications 518 are programs that execute functions defined in the programs. Various programming languages can be employed to create one or more of the applications 518, structured in a variety of manners, such as object-oriented programming languages (e.g., Objective-C, Java, C++, and/or the like), procedural programming languages (e.g., C, assembly language, and/or the like), and/or the like. In a specific example, the third-party application 544 (e.g., an application developed using the ANDROID™ or IOS™ software development kit (SDK) by an entity other than the vendor of the particular platform) could be mobile software running on a mobile operating system such as IOS™, ANDROID™, WINDOWS® Phone, and/or the like. In this example, the third-party application 544 can invoke the API calls 520 provided by the operating system 512 to facilitate functionality described herein.

To promote an understanding of the principles of the present disclosure, various embodiments are illustrated in the drawings. The embodiments disclosed herein are not intended to be exhaustive or to limit the present disclosure to the precise forms that are disclosed in the above detailed description. Rather, the described embodiments have been selected so that others skilled in the art may utilize their teachings. Accordingly, no limitation of the scope of the present disclosure is thereby intended.

In any instances in this disclosure, including in the claims, in which numeric modifiers such as first, second, and third are used in reference to components, data (e.g., values, identifiers, parameters, and/or the like), and/or any other elements, such use of such modifiers is not intended to denote or dictate any specific or required order of the elements that are referenced in this manner. Rather, any such use of such modifiers is intended to assist the reader in distinguishing elements from one another, and should not be interpreted as insisting upon any particular order or carrying any other significance, unless such an order or other significance is clearly and affirmatively explained herein.

Moreover, consistent with the fact that the entities and arrangements that are described herein, including the entities and arrangements that are depicted in and described in connection with the drawings, are presented as examples and not by way of limitation, any and all statements or other indications as to what a particular drawing "depicts," what a particular element or entity in a particular drawing or otherwise mentioned in this disclosure "is" or "has," and any and all similar statements that are not explicitly self-qualifying by way of a clause such as "In at least one embodiment," and that could therefore be read in isolation and out of context as absolute and thus as a limitation on all embodiments, can only properly be read as being constructively qualified by such a clause. It is for reasons akin to brevity and clarity of presentation that this implied qualifying clause is not repeated ad nauseum in this disclosure.

What is claimed is:

1. A method comprising:
   determining a baseline cyberthreat-risk score for a user;
   displaying the baseline cyberthreat-risk score via a user interface;
   presenting at least one cyberthreat-education activity via the user interface, the at least one cyberthreat-education activity comprising a simulated cyberthreat, wherein the simulated cyberthreat comprises a simulated phishing attack involving a simulated phone call;
   receiving, via the user interface, at least one user input associated with the presented at least one cyberthreat-education activity, the at least one user input comprising a response to the simulated cyberthreat;
   generating an updated cyberthreat-risk score at least in part by updating the baseline cyberthreat-risk score based at least in part on the user input;
   displaying the updated cyberthreat-risk score via the user interface; and
   selecting an authentication protocol for the user based at least in part on the updated cyberthreat-risk score of the user.

2. The method of claim 1, wherein determining the baseline cyberthreat-risk score for the user comprises:
   receiving one or more cyberthreat-survey answers from the user; and
   determining the baseline cyberthreat-risk score for the user based at least in part on the one or more cyberthreat-survey answers.

3. The method of claim 1, wherein determining the baseline cyberthreat-risk score for the user comprises determining the baseline cyberthreat-risk score for the user based at least in part on one or more applications installed on a device of the user.

4. The method of claim 1, wherein determining the baseline cyberthreat-risk score for the user comprises:
   searching a plurality of web sites to identify sites containing information associated with the user; and
   determining the baseline cyberthreat-risk score for the user based at least in part on results of the searching.

5. The method of claim 1, wherein determining the baseline cyberthreat-risk score for the user comprises determining the baseline cyberthreat-risk score for the user based at least in part on a browsing history on a device of the user.

6. The method of claim 1, wherein determining the baseline cyberthreat-risk score for the user comprises determining the baseline cyberthreat-risk score for the user based at least in part on a degree of password reuse among a plurality of online accounts of the user.

7. The method of claim 1, wherein the user interface is provided via a web portal.

8. The method of claim 1, wherein the user interface is provided via a mobile app.

9. The method of claim 1, wherein:
   the at least one cyberthreat-education activity comprises a cyberthreat-education video; and
   the at least one user input comprises an indication that the user has watched the cyberthreat-education video.

10. The method of claim 1, wherein:
    the at least one cyberthreat-education activity comprises a cyberthreat-education quiz; and
    the at least one user input comprises at least one response to the cyberthreat-education quiz.

11. The method of claim 1, wherein the simulated cyberthreat comprises a simulated email message.

12. The method of claim 1, wherein the simulated cyberthreat is presented unprompted via the user interface.

13. The method of claim 1, further comprising:
    sending an email message to an email account of the user, wherein the updated cyberthreat-risk score is further based on a user action taken in connection with the email message.

14. The method of claim 1, further comprising selecting a transaction-security protocol for at least one monetary range of transactions based at least in part on the updated cyberthreat-risk score of the user.

15. The method of claim 1, further comprising conveying a reward to the user based at least in part on the updated cyberthreat-risk score of the user.

16. A system comprising:
    at least one processor; and
    one or more non-transitory computer readable storage media containing instructions executable by the at least one processor for causing the at least one processor to perform operations comprising:
    determining a baseline cyberthreat-risk score for a user;
    displaying the baseline cyberthreat-risk score via a user interface;
    presenting at least one cyberthreat-education activity via the user interface, the at least one cyberthreat-education activity comprising a simulated cyberthreat, wherein the simulated cyberthreat comprises a simulated phishing attack involving a simulated phone call;
    receiving, via the user interface, at least one user input associated with the presented at least one cyberthreat-education activity, the at least one user input comprising a response to the simulated cyberthreat;
    generating an updated cyberthreat-risk score at least in part by updating the baseline cyberthreat-risk score based at least in part on the user input;
    displaying the updated cyberthreat-risk score via the user interface; and
    selecting an authentication protocol for the user based at least in part on the updated cyberthreat-risk score of the user.

17. One or more non-transitory computer readable storage media containing instructions executable by at least one processor for causing the at least one processor to perform operations comprising:
    determining a baseline cyberthreat-risk score for a user;
    displaying the baseline cyberthreat-risk score via a user interface;
    presenting at least one cyberthreat-education activity via the user interface, the at least one cyberthreat-education activity comprising a simulated cyberthreat, wherein the simulated cyberthreat comprises a simulated phishing attack involving a simulated phone call;
    receiving, via the user interface, at least one user input associated with the presented at least one cyberthreat-education activity, the at least one user input comprising a response to the simulated cyberthreat;

generating an updated cyberthreat-risk score at least in part by updating the baseline cyberthreat-risk score based at least in part on the user input;
   displaying the updated cyberthreat-risk score via the user interface; and
   selecting an authentication protocol for the user based at least in part on the updated cyberthreat-risk score of the user.

\* \* \* \* \*